March 10, 1970  W. BURKHARDT ET AL  3,499,343

TWO-STEP REDUCTION GEAR TRANSMISSION

Filed Feb. 1, 1968  2 Sheets-Sheet 1

Inventors:
Walter Burkhardt,
Klaus Hänsgen and
Gerhard Ridder,
By [signature],
Their Attorney.

March 10, 1970 W. BURKHARDT ET AL 3,499,343
TWO-STEP REDUCTION GEAR TRANSMISSION
Filed Feb. 1, 1968 2 Sheets-Sheet 2

Inventors:
Walter Burkhardt,
Klaus Hänsgen and
Gerhard Ridder,
THEIR ATTORNEY.

3,499,343
Patented Mar. 10, 1970

3,499,343
TWO-STEP REDUCTION GEAR TRANSMISSION
Walter Burkhardt, Klaus Hansgen, and Gerhard Bidder, Witten (Ruhr), Germany, assignors to Lohmann & Stolterfoht Aktiengesellschaft, Witten (Ruhr), Germany, a corporation of Germany
Filed Feb. 1, 1968, Ser. No. 702,367
Claims priority, application Germany, Feb. 3, 1967, L 43,960
Int. Cl. F16h *57/00;* F16d *3/14*
U.S. Cl. 74—411         9 Claims

ABSTRACT OF THE DISCLOSURE

A two-step reduction gear transmission has an input and an output shaft, and therebetween paired distributing and collecting shafts, the distributing shaft of each pair being in driving connection with its collecting shaft by means of a flexible coupling disposed outside the walls of the transmission housing.

---

The invention relates to gear transmissions, and relates more particularly to a two-step reduction gear transmission. Still more particularly, the invention relates to such a reduction gear transmission that has an input shaft and an output shaft, and two intermediate shafts each provided with a flexible coupling, the flexible coupling being disposed in the flux between a gear that is mounted on an intermediate shaft and driven from a pinion mounted on the input shaft and, respectively, a pinion that is mounted on an intermediate shaft and drives a gear that is mounted on the output shaft.

Transmissions of this type, which may have more than the aforesaid two intermediate shafts, have been known for quite a while. The power is distributed from the input shaft, with the aid of gears of the first reduction step or steps to the intermediate shafts, and is collected with the aid of gears of the reduction gear steps, the amount of which steps are the same as those of the first reduction gear, from the intermediate shafts to the output shaft. In order to achieve a most uniform distribution of the power to the intermediate shafts, each of the divisional fluxes is provided with an elastic member. In accordance with constructions of the prior art, each intermediate shaft is divided at one-half of its length, and the dividing space bridged by a non-disengageable flexible coupling, the flexible elements of which are composed of steel springs.

The power compensation may also be achieved by means of helical or spiral gearing, where the construction admits of a certain axial shifting of one of the meshing gears.

The aforesaid constructions, however, often are not suitable for present day high loads, and have been found deficient therein that they often are incapable of controlling the torsional vibrations.

It is accordingly among the principal objects of the instant invention to provide a reduction gear transmission of the type referred to, that avoids the drawbacks of the prior art.

It is another object of the invention to provide such a reduction gear transmission that is provided with suitable highly flexible couplings. In accordance with a preferred embodiment of the instant invention, for instance, the flexible elements of the flexible couplings are composed of highly elastic rubber. The prior art has avoided the use of such rubber elements in the instant environment, because rubber is very sensitive to contact with oil.

It is a further object of the invention to provide a reduction gear transmission of the type referred to wherein the flexible couplings are so arranged that they avoid contact with oil. In accordance with the instant invention, the flexible couplings are disposed outside the housing or housings of the reduction gear transmission, and therefore avoid that the flexible elements of the flexible couplings, which elements may be composed of rubber or a similar suitable material, make any contact with oil from either oil guns or from oil vapors that prevail on the interior of the housing or housings.

It is still another object of the invention to provide a reduction gear transmission of the type referred to in which the flexible couplings are disengageable.

It is still a further object of the invention to provide a reduction gear transmission of the type referred to, wherein the flexible couplings are actuatable in response to the action of a pressure medium. In accordance with a preferred embodiment, the flexible couplings may be formed of highly flexible double cone friction clutches with radially pre-tensioned rubber elements.

In accordance with a preferred embodiment of the instant invention, the flexible couplings are mounted on a portion of intermediate shafts that project through the transmission housing. This has the advantage that the flexible elements of the flexible couplings may be exchanged with great facility.

In accordance with another embodiment, two housings are provided instead of a single housing, and the flexible couplings are arranged in the space between the two housings. One of the housings will contain the one-step distributor gear assembly, and the other housing the one-step collecting gear assembly. Both housings are interconnected by means of the intermediate shafts that carry, in the space between the housings, the flexible couplings. In such a construction it is advantageous to arrange the flexible couplings in such a manner that the flexible elements, whenever needed, may be dismounted radially, without need to shift the intermediate shafts axially.

Further objects and advantages of the invention will be set forth in part in the following specification and in part will be obvious therefrom without being specifically referred to, the same being realized and attained as pointed out in the claims hereof.

With the above and other objects of the invention in view, the instant invention consists in the novel construction, arrangement and combination of various devices, elements and parts, as set forth in the claims hereof, certain embodiments of the same being illustrated in the accompanying drawings and described in the specification.

In the accompanying drawings.

Figure 1:
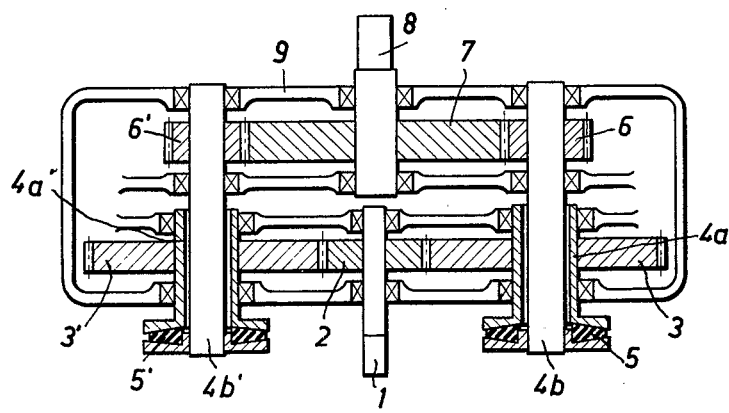
FIG. 1 is a sectional view of a reduction gear transmission in accordance with an embodiment of the instant invention, with the flexible couplings disposed outside the single transmission housing.

In the single housing embodiment of FIG. 1, there is shown a transmission which has an input shaft 1 which is axially aligned with the output shaft 8. Intermediate shafts 4 and 4' are provided on opposite sides of the input shaft 1 and the output shaft 8, and the axes of which are substantially parallel with the axis of the aligned shafts 1 and 2, and disposed in the same plane thereof.

The input shaft 1 carries a pinion 2 which meshes with gears 3 and 3'. Each of the gears 3 and 3' is mounted on a hollow shaft 4a and 4a', respectively. Each of the hollow shafts 4a and 4a' forms a distributing shaft section of the intermediate shaft 4, 4', respectively. The other shaft portion of each intermediate shaft is formed by a solid shaft 4b and 4b', respectively. The hollow shafts 4a and 4a' project with their driving end from the single transmission housing 9, and each surrounds its solid shaft 4b, 4b', respectively, the latter also projecting out of the housing 9 and terminating with its end near the end of the respective hollow shaft 4a, 4a', respectively. The solid shafts 4b, 4b', carry each a pinion 6, 6', respectively. Each of the solid shafts 4b, 4b' forms a collecting shaft section of the respective intermediate shaft 4, 4'.

The hollow shaft 4a is in driving connection with the solid shaft 4b outside the housing 9, by means of a flexible coupling 5. The flexible coupling 5 is actuatable in response to the action of a pressure medium; similarly, the hollow shaft 4a' is in driving connection with the solid shaft 4b', by means of the flexible coupling 5'.

The said pinions 6 and 6' mesh with a gear 7 that is mounted on the output shaft 8.

Any unevenness in the load distribution, due to inaccuracies either in machining or in assembling, will be compensated by the highly flexible coupling 5, 5'.

Beyond that, the couplings furthermore act as compensating elements with respect to the transmission of torsional vibrations between the input shaft 1 and the output shaft 8. When necessary, the disengageable couplings may be disconnected by the action of the aforesaid pressure medium. The highly elastic flexible elements, made of rubber or a similar material, are easily accessible and may simply be changed from the side of the ends of the shafts 4 and 4'.

Figure 2:
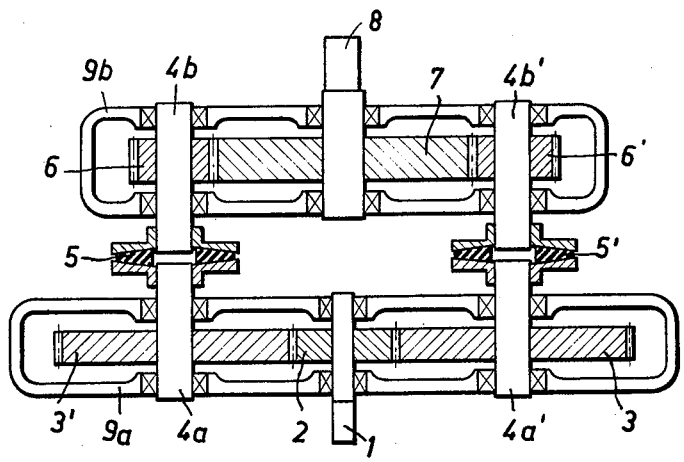
FIG. 2 is a sectional view, similar to FIG. 1, but embodying a modification that includes two transmission housings spaced apart from each other and the flexible couplings arranged in the space between the two housings.

In the modification of FIG. 2, there are shown two transmission housings 9a and 9b, respectively. In many other respects, however, the construction of the modification of FIG. 2 is similar to that of the embodiment of FIG. 1. The flexible couplings 5 and 5' are arranged in the space between the housings 9a and 9b, and mounted in the divided intermediate shafts 4 and 4', respectively. These shafts are no longer divided into a hollow distributing shaft section and a solid collecting shaft section, but the two shaft sections 4a and 4b, and 4a' and 4b', respectively, are in axial alignment and, in accordance with the illustration of FIG. 2, may be in preferred solid form and have their end portions spaced from each other and bridged by a flexible coupling.

For facilitating the exchange of the highly elastic flexible elements of rubber or the like, the flexible couplings 5 and 5' are so constructed that radial dismantling thereof is possible without any axial movement of the intermediate shaft sections 4a, 4b, or 4a', 4b', respectively.

In accordance with a further modification, the input shaft may carry two pinions instead of one, and one of these pinions may mesh with the gear of one intermediate shaft, and the other pinion with the gear of the other intermediate shaft. Moreover, instead of the aforesaid two pinions, a single pinion of double width may be provided of which each portion meshes with the gear of a different intermediate shaft, which gears are axially off-set relative to each other.

As best shown in FIGS. 1 and 2, the input shaft 1 and the output shaft 8 may be in axial alignment. As previously explained, the axes of the shafts 1, 8, 4 and 4', may be in the same plane; in accordance with a further modification, however, the input shaft 1 and/or the output shaft 8 may be so disposed that its axis is disposed outside of the aforesaid plane.

Figure 3:
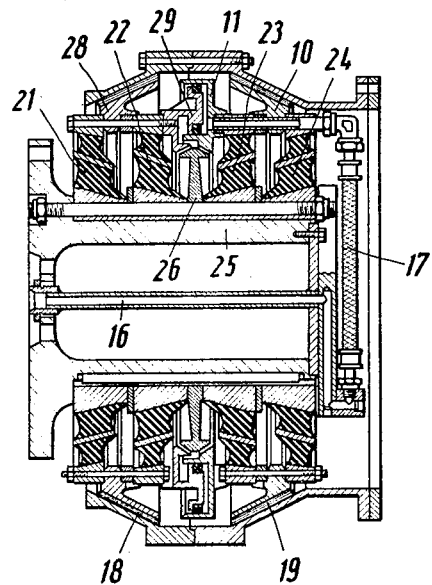
FIG. 3 is a central axial sectional view of a flexible coupling.
Figure 4:
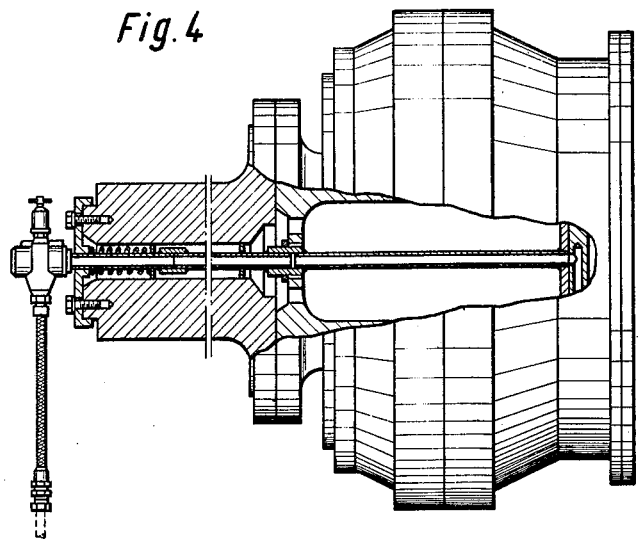
FIG. 4 is a fragmentary elevational view, partly in section, of a flexible coupling with a central pressure medium feed connection.

The clutch of FIGS. 3 and 4 is operated by pressurized air which forms the aforesaid pressure medium. As best shown in FIG. 4, a rotary connection is provided near the free shaft end, to convey the pressurized air through a central duct to the conduit 16 (FIG. 3). From the duct 16 the pressurized air is conducted through a tube 17 to a clutch cylinder 11. By this application of the pressurized air, the friction cones 10 and 28 (FIG. 3) are pressed powerfully against the conical ring 18 and the conical flange 19, so that a positive power transmission is thereby assured.

The rotational movement of the shaft will be transferred from the ring 18 and the flange 19, respectively, by means of the friction cones 28 and 10, elastic ring elements 21, 22, 23 and 24 onto the hub 5 of the clutch. The elastic ring elements 21–24 will be stressed for torque. Thus, the friction clutch is actuatable in response to the action of the pressurized air.

When the pressure medium is de-activated, the elastic ring elements 21–24 will separate the friction cones 10 and 28 from the conical ring 18 and th econical flange 19. During that action, the pistons 29 of the clutch cylinder 11, as well as the clutch cylinder 11 itself, will be supported by the supporting ring 26.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a two-step reduction gear transmission, the combination of
    housing means,
    an input shaft leading into and an output shaft leading from said housing means,
    transmission means between said input and output shafts including intermediate shafts comprising an even number of distributing shafts and an even number of collecting shafts each in driven connection with a distributing shaft,
    first gear means disposed between said input shaft and said distributing shafts, second gear means between said collecting shafts and said output shaft,
    and a flexible coupling arranged between each distributing shaft and the collecting shaft driven thereby and establishing driving connection therebetween, said flexible couplings being located outside said housing means.

2. In a transmission, as claimed in claim 1, said first gear means including a first pinion mounted on said input shaft and a first gear mounted on each distributing shaft and meshing with said first pinion, said second gear means including a second pinion mounted on each collecting shaft and a second gear mounted on said output shaft and driven by said second pinions.

3. In a transmission, as claimed in claim 1, each flexible coupling including flexible elements composed of elastic material.

4. In a transmission, as claimed in claim 1, each flexible coupling including flexible rubber elements.

5. In a transmission, as claimed in claim 1, all of said flexible couplings being disengageable.

6. In a transmission, as claimed in claim 1, each flexible coupling being a highly flexible double cone friction clutch actuatable in response to the action of a pressure medium.

7. In a transmission, as claimed in claim 1, said housing means forming a single walled housing, each distributing shaft being a hollow shaft and surrounding concentrically and collecting shaft driven thereby and projecting therewith through said housing wall and having one longitudinal end disposed near that of its collecting shaft outside the wall of said housing, each flexible coupling being mounted outside said housing near said longitudinal ends to its distributing and collecting shafts.

8. In a transmission, as claimed in claim 1, said housing means comprising two walled housings disposed apart from each other defining therebetween a space, each distributing shaft being axially aligned with its collecting shaft though having its end spaced apart from the end of said collecting shaft, each flexible coupling being disposed in said space between the housings and interconnecting said shaft ends.

9. In a transmission, as claimed in claim 1, each flexible coupling being rotatable about an axis of rotation and including flexible elements operable to be dismantled radially with respect to said axis.

References Cited

UNITED STATES PATENTS

| | | | |
|---|---|---|---|
| 1,551,565 | 9/1925 | Hodgkinson | 74—410 |
| 2,785,580 | 3/1957 | Andrews. | |
| 3,023,593 | 3/1962 | Nallinger. | |
| 3,167,967 | 2/1965 | Silberger | 74—411 |

LEONARD H. GERIN, Primary Examiner

U.S. Cl. X.R.

64—27; 74—410